United States Patent [19]

Grieshaber et al.

[11] Patent Number: 5,168,847
[45] Date of Patent: Dec. 8, 1992

[54] FUEL INJECTION PUMP FOR INTERNAL COMBUSTION ENGINES

[75] Inventors: Hermann Grieshaber, Aichtal-Aich; Hans-Joachim Siebert, Schwieberdingen; Walter Egler, Stuttgart; Norbert Meissner, Neustadt, all of Fed. Rep. of Germany

[73] Assignee: Robert Bosch GmbH, Stuttgart, Fed. Rep. of Germany

[21] Appl. No.: 845,883

[22] Filed: Mar. 4, 1992

[30] Foreign Application Priority Data

Mar. 4, 1991 [DE] Fed. Rep. of Germany ....... 4106813

[51] Int. Cl.$^5$ .................. F02B 3/00; F02M 37/04
[52] U.S. Cl. .................. 123/299; 123/500; 123/503
[58] Field of Search ............ 123/500, 501, 299, 300, 123/503, 449

[56] References Cited

U.S. PATENT DOCUMENTS

| | | | |
|---|---|---|---|
| 2,871,796 | 2/1959 | Dreisin et al. | 123/299 |
| 3,942,914 | 3/1976 | Höfer et al. | 123/449 |
| 4,367,706 | 1/1983 | Scheying | 123/300 |
| 4,426,198 | 1/1984 | Bastenhof et al. | 123/299 |
| 4,635,605 | 1/1987 | Faupel et al. | 123/503 |
| 4,662,336 | 5/1987 | Höfer et al. | 123/449 |
| 4,681,080 | 7/1987 | Schukoff | 123/299 |
| 4,718,385 | 1/1988 | Konrath | 123/503 |
| 4,737,086 | 4/1988 | Yamaguchi et al. | 123/500 |
| 4,741,314 | 5/1988 | Höfer et al. | 123/503 |
| 4,881,506 | 11/1989 | Hoecker | 123/500 |
| 4,924,833 | 5/1990 | Höfer et al. | 123/503 |
| 4,957,418 | 9/1990 | Pischinger et al. | 123/299 |
| 4,975,029 | 12/1990 | Hatz | 123/299 |
| 5,074,766 | 12/1991 | Kochanowski | 123/299 |
| 5,097,812 | 3/1992 | Augustin | 123/500 |

FOREIGN PATENT DOCUMENTS

| | | | |
|---|---|---|---|
| 1026572 | 4/1955 | Fed. Rep. of Germany . | |
| 360980 | 7/1938 | Italy | 123/300 |
| 0105616 | 8/1979 | Japan | 123/503 |
| 688003 | 2/1953 | United Kingdom | 123/299 |
| 893621 | 4/1962 | United Kingdom . | |

Primary Examiner—E. Rollins Cross
Assistant Examiner—Thomas N. Moulis
Attorney, Agent, or Firm—Edwin E. Greigg; Ronald E. Greigg

[57] ABSTRACT

A fuel injection pump for internal combustion engines is proposed, in which to attain particularly quiet operation of an engine that is operated with direct injection, the fuel delivery is subdivided into a preinjection and a main injection; this injection is attained by annular groove, coinciding with one another, on the pump piston and pump cylinder, and a connecting groove connecting the coinciding annular grooves with a relief opening. After a partial stroke in the region of coincidence of the annular grooves with one another, the communication with the relief opening is interrupted again. The preinjection quantity can be kept particularly small here, with a short interval between the preinjection and the main injection; in combination with a two-spring-holder injection valve, this particularly small preinjection quantity can be kept constant to a great extent even at varying engine speeds, to attain an optimal reduction in combustion noise at various engine speeds.

13 Claims, 2 Drawing Sheets

FUEL INJECTION PUMP FOR INTERNAL COMBUSTION ENGINES

BACKGROUND OF THE INVENTION

The invention is based on a fuel injection pump for internal combustion engines.

In a fuel injection pump of this type, known from British Patent No. 893,621, a fuel line discharges into the pump cylinder via an intake bore that is opened at bottom dead center by the face end of the pump piston, by way of which fuel can flow into the pump work chamber before the onset of the delivery stroke. An outlet opening also branches off from the pump cylinder and is opened by the first, helically extending control edge on the pump piston in order to terminate the effective pump piston delivery stroke. The first control edge on the pump piston defines a circumferential groove provided there, which is in continuous communication with the pump work chamber via a longitudinal groove. Additionally provided in the jacket face of the pump piston is a circumferentially extending recess, which can be made to coincide with the recess provided in the jacket of the pump cylinder; the latter recess, after a beginning stroke of the pump piston once its end edge has closed the inlet opening, still communicates with the outlet opening but does not yet communicate with the recess in the jacket face of the pump cylinder. After an initial delivery stroke, the recess on the pump piston comes to communicate with the recess in the cylinder jacket face, while simultaneously communicating with the outlet opening. Furthermore, the recess in the pump cylinder jacket also communicates with the pump work chamber, but after a stroke of the pump piston is closed by the piston's end edge. At that point, the recess in the pump piston still communicates with the outlet opening. The effect of this embodiment is that over the portion of the pump piston stroke via which communication between the outlet opening and the pump work chamber is established via the recess in the pump piston and the recess in the pump cylinder jacket, the fuel injection is interrupted, and it is not continued, as a main injection, until after the closure toward the pump work chamber of the recess in the pump cylinder jacket, when the outlet opening is opened by the first control edge.

Fuel injection pumps operating by the same principle are known for instance from German Patent Disclosure Documents DE-OS 38 09 700, 29 22 426 and 37 31 817. With such embodiments, a small preinjection quantity is supposed to be injected into the engine cylinders first, in the course of the pump piston delivery stroke, with the main injection quantity injected only afterward, after an interruption in the injection. The goal of these embodiments is by the selected disposition of recesses to attain a very brief interruption in fuel delivery, which is shorter than if, for example, by means of a transverse groove in the pump piston jacket face communicating continuously with the pump work chamber, a typical relief bore were opened over its entire diameter adjoining the control edge determining the delivery. The preinjection a short interval ahead of the main injection is required in order to reduce noise of engines operated with direct injection. In a known manner, during the ignition delay in continuous injection at a high injection rate, relatively large quantities of fuel are stored ahead of time before ignition begins. The pre-stored quantity of fuel that then combusts suddenly produces a steep pressure rise, which makes itself felt in the form of noise. To avoid the development of black smoke during combustion or to reduce it, and to keep fuel consumption low, a correct graduation of the preinjection quantity and of the interval between the preinjection and the main injection must be adhered to. The conditions for this vary fundamentally as a function of load and rpm, but nevertheless a variable control of the preinjection quantity and the preinjection interval would entail very considerable effort and expense. It is therefore a goal to embody the construction of fuel injection pumps in such a way that a reasonable combustion behavior can be obtained with a single set of injection equipment, with a structurally specified preinjection fuel quantity and interval between preinjection and main injection. If the intervals between coincidence of the recesses remain constant, an rpm dependency results from rpm-dependent predelivery and postdelivery effects. Because of the throttle influence and the fact that the coincidence becomes shorter and shorter in terms of time with increasing rpm, the preinjection quantity increases over the rpm. Yet the requirement of the engine for optimal conditions is precisely the opposite.

OBJECT AND SUMMARY OF THE INVENTION

With the provisions according to the invention as defined hereinafter, this increase in fuel quantity over the rpm is largely compensated for. By using the fuel injection valve as defined herein, the injection rate during the preinjection is throttled in the first opening stroke of the injection valve, so that the rpm-dependent rise in the injection quantity is reduced. The throttling in the first opening stage of the injection valve has the effect, with increasing rpm, of reducing the fuel injection quantity, which is contrary to the rpm-dependent increase in fuel delivery for the preinjection quantity in the fuel injection pump. Advantageously, a constant preinjection quantity and thus an improved combustion result in terms of noise and emissions and fuel consumption are obtained to a substantially better extent.

In an advantageous embodiment of the invention, a rapid closure of the inlet opening carrying the fuel to the pump work chamber takes place, with a very short throttling phase, so that the rpm-dependent predelivery effect, that is, the supply onset shifted to "early" with increasing injection quantity have less influence.

Because the inlet opening also acts as the relief opening, the wall, or liner, forming the pump cylinder of the fuel injection pump is not weakened as much by openings. In another embodiment of the invention, the fuel injection pump is embodied to generate a preinjection, with a minimum of apertures in the pump cylinder wall being provided, with an embodiment of the recesses controlling the injection interruption being favorable in terms of manufacture and strength. Because of the limiting edge of the recess in the pump cylinder wall, extending in regions that are transverse to the pump piston axis, the opening cross section increases greatly per unit of pump piston travel, making for only slight rpm-dependent throttling factors.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
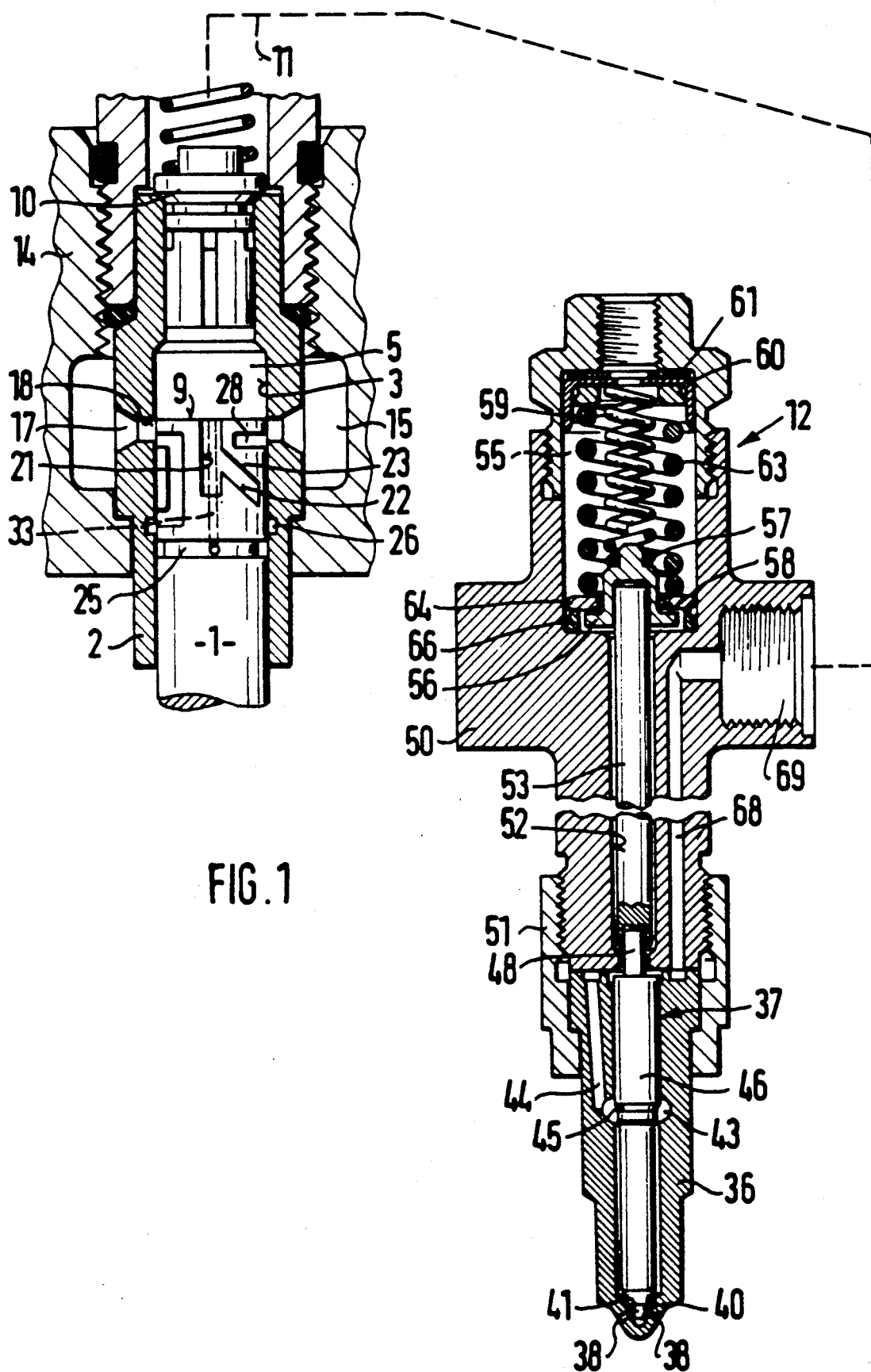
FIG. 1 is a fragmentary view of a fuel injection pump in section, with a fuel injection valve by way of way of example.

FIG. 1 shows part of an in-line injection pump in section, with one of the pump pistons 1, which is disposed in a cylinder liner 2 that forms a pump cylinder 3. The pump piston is driven to reciprocate in a known manner by a cam drive, and with its face end 9 the piston encloses a pump work chamber 5 in the pump cylinder 3. On the end opposite the face end of the pump piston, the pump work chamber is defined by a known pressure valve 10, by way of which in the delivery stroke of the pump piston, fuel is pumped out of the pump work chamber 5 into an injection line adjoining the pressure valve downstream of the pressure valve and leading to a fuel injection valve 12. The cylinder liner 2 is tightly inserted into a housing 14 of the fuel injection pump and the cylinder liner is surrounded by a suction chamber 15 disposed in the housing; this chamber is supplied with fuel in the usual manner from a fuel supply tank, by a fuel prefeed pump, not shown in further detail. The suction chamber serves both as a fuel supply and as a relief chamber for fuel to be diverted from the pump work chamber. To this end, the cylinder liner has a through bore 17, which serves as a fuel line between the pump work chamber and the suction chamber and having an inlet opening 18, toward the pump cylinder, which simultaneously is a relief opening.

Figure 2:
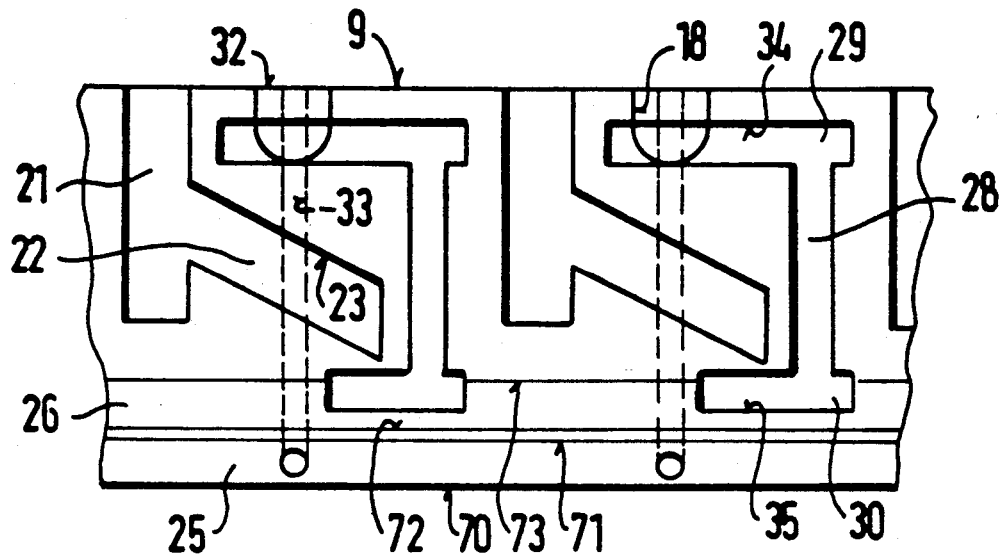
FIG. 2 is a developed view of the pump piston jacket face, covered by the jacket face of the pump cylinder, with the cross sections and recesses according to the invention.

The pump piston, in a manner known per se, has a longitudinal groove 21 on its jacket face; this groove splits into an oblique groove 22, branching off obliquely to the drive side of the pump piston, and the oblique groove defines the top of a first control edge 23 pointing toward the pump work chamber. It is also possible to provide the longitudinal groove and the oblique groove in a dual embodiment, or in other words opposite one another with point symmetry, as is also shown in FIG. 2. With these grooves, the fuel injection pump functions in the conventional manner, such that at the end of the intake stroke of the pump piston, when the pump piston is in its lowermost position, the inlet opening 18 is uncovered, so that the pump work chamber 5 can thus be filled with fuel. In the ensuing stroke of the pump piston, the face end 9 closes the inlet opening 18 after an initial stroke, and a pressure buildup follows in the pump work chamber, up to the injection pressure. From this closure on, the pump piston pumps fuel at injection pressure to the injection valve and from there to the combustion chamber. This high-pressure delivery is interrupted whenever, depending on a rotational position of the pump piston, which in a known manner can be rotated by a rotating device, the first control edge 23 opens the inlet opening 18, which now serves as a relief opening, so that fuel can flow out of the pump work chamber to the pump suction chamber 15 via the longitudinal groove 21 and the oblique groove 22. The pump work chamber is thus relieved, so that the fuel injection is interrupted. The remaining fuel injection quantity that continues to be pumped by the pump piston then flows away to the suction chamber. The width of the oblique groove is designed such that the communication with the suction chamber continues to exist until top dead center of the pump piston. The farther the pump piston is rotated to the right as seen in the drawing, the shorter is the pump piston delivery stroke that is effective for injection, and thus the smaller is the injectable fuel quantity.

In a further feature, a recess is now provided on the pump piston, in the form of an annular groove 25 having limiting edges 70 and 71 parallel to one another, and another recess is provided in the wall of the pump cylinder 3, in the form of an annular groove 26 having limiting edges 72 and 73, also parallel to one another. A U-shaped connecting groove is also machined into the jacket face of the pump piston; it can be better seen in the developed view of FIG. 2. With its arms 29 and 30, this groove extends around the oblique groove 22 on either side. The limiting edges 34 and 35 of these arms are parallel to one another and parallel to the limiting edges of the annular grooves 25 and 26, these edges being located in a radial plane of the pump piston. It can also be seen from FIG. 2 that the inlet opening or relief opening 18 has a rectilinear upper limiting edge 32, parallel to the face end 9 of the pump piston and to the limiting edges 34, and that the annular groove 25 in the jacket face of the pump piston communicates continuously with the pump work chamber via a conduit 33 beginning at the face end of the pump piston and extending within the pump piston.

In the position shown in FIG. 2, corresponding to its position in FIG. 1 as well, the pump piston has just closed the relief opening 18. Moreover, since the relief opening 18 does not communicate with the longitudinal groove 21—this takes place by rotation of the pump piston when the engine is turned off—the pump piston motion produces high pressure in the pump work chamber, and an injection ensues. In this process both the annular groove 25 and the connecting groove 28 move upward, and after an initial injection stroke the annular groove 25 comes to coincide with the annular groove 26, so that the annular groove 26 also communicates with the pump work chamber via the conduit 33. At that instant, the lower arms 30 of the connecting groove also coincides with the annular groove 26, and the upper arm 29 likewise coincides with the relief opening 18. Thus with the coincidence of the annular groove 25 and 26, communication between the pump work chamber and the relief opening is established, so that the pump work chamber is relieved and the fuel injection is interrupted. This continues until such time as the lower arm 30 of the connecting groove, as the stroke of the pump piston continues, leads the position of coincidence with the annular groove 26 in the wall of the pump cylinder. Fuel pressure can then build up again in the pump work chamber, and as a consequence the main injection is carried out, until the first control edge 23 of the oblique groove 22 comes to coincide with the relief opening 18. Depending on the rotational position, the final termination of the pump piston delivery stroke that is effective for injection occurs at an earlier or later point n the pump piston stroke, since the pump work chamber is relieved toward the suction chamber 15 via the longitudinal groove 21 and oblique groove 22.

This version has the advantage that large overflow cross sections are attained at a relatively short stroke, by means of the mutually parallel, circumferentially extending limiting edges of the annular grooves and of the arms 29 and 30 of the connecting groove 28 and of the upper limiting edge 32 of the relief opening 18. The rpm-depending throttling actions at the transition of the cross sections to one another, or the rpm-dependent predelivery effects, are thus kept small.

The fuel pumped by the pump piston reaches the injection valve 12 via the injection line 11. Unlike typically used valves, this is now an injection valve with a so-called two-spring holder. This holder initially conventionally comprises a valve body 36, into which a valve needle 37 is fitted and which has fuel outlet openings in the form of injection bores 38 on its face end, which are controlled by the valve needle 37.

To this end, the valve needle has a conical tip 40, which with its jacket face acting as a sealing face cooperates with a correspondingly conically embodied valve seat 41. The injection bores 38 lead away from the valve seat and are embodied and aligned in accordance with the requirements of the combustion chamber of the engine in which the injection valve is used. The bores preferably have the same diameter. Upstream of the valve seat, a pressure chamber 43 is typically provided, into which a conduit 44 discharges that extends approximately parallel to a shaft 46 of the valve needle that forms a pressure shoulder 45 in the pressure chamber 43. The shaft is tightly guided in the valve body and protrudes with a pressure tang 48 from the valve body, on the face end opposite the injection opening 38. By this face end, the valve body is joined firmly and tightly to the body 50 of a spring holder by means of a union nut 51. This body 50 has a longitudinal bore 52, into which the pressure tang 48 protrudes and is there coupled to a pressure rod 53, which extends through the longitudinal bore 52 in a spring chamber 55 disposed in the body 50. A spring plate 56, which has a first shoulder 57 of small diameter and a second shoulder 58 following it in the direction of the valve body and having a larger diameter, is placed on the end of the pressure bar protruding into the spring chamber. Supported on the first shoulder is a first compression spring 59, which has an opposite abutment 60 on the opposite face end 61 of the spring chamber 55. Supported on that face end is a second compression spring 63, which coaxially surrounds the first compression spring and rests on its other end on a perforated disk 64, which in turn is supported toward the valve body on a fixed stop 66. This stop may for instance be embodied as a ring, which can be placed in the cylindrical spring chamber and come to rest on the face end toward the valve body of the spring chamber. The perforated disk 64 has a stroke spacing with respect to the second shoulder 58 if the valve needle is in the closing position, with its sealing face resting on the valve seat 12, and serves as a stop for this shoulder.

Figure 3:
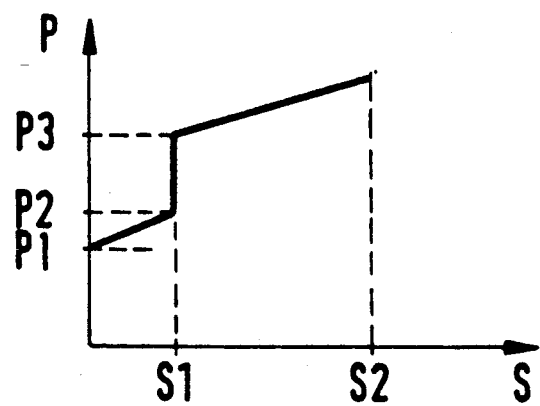
FIG. 3 is a view of the opening course of the fuel injection valve of FIG. 1.

The conduit 44 in the valve body is continued via a conduit 68 in the body 50 of the nozzle holder. This conduit extends parallel to the longitudinal bore 52 and continues to a connection piece 69 to which the injection line 11 is connected. The spring and the dimensioning of the valve needle with the pressure shoulder 45 are designed such that the valve needle upon supply onset is initially raised by a short partial stroke, until the second shoulder 58 comes to rest on the stop embodied by the perforated disk 64. This stroke is identified in FIG. 3 as s, with a pressure increase from P1 to P2. Since the perforated disk rests on the fixed stop 66 with initial stress, the pressure in the pressure chamber 45 must rise from P2 to P3 before the valve needle can carry out a further stroke, counter to the force of the second compression spring 63. In the first stroke stage along the line from P1 to P2, or the stroke distance S, the injection bore 38 is uncovered by the sealing face of the valve needle, but the spacing between the sealing face and the valve seat 41 remains so slight that the annular inlet section toward the diameters of the injection bores is smaller than the injection bore diameter. A throttled connection with the injection bores 38 thus develops, so that the injection also takes place with throttling. This injection at a reduced, throttled injection rate continues until the pressure P3 is attained and the injection valve opens farther. Depending on how the softness of the compression springs is designed, the steepness of the rise between P1 and P2 and P3 until fully open can be variable. The injection rate can be adapted to the conditions of the engine.

This injection valve has the advantage that at a short valve needle stroke, not all of the fuel injection quantity pumped by the pump piston in accordance with the delivery rate specified in this case attains injection immediately; instead, the injection takes place in delayed fashion, via the throttled injection openings, at a lower injection rate. By smoothing out the fuel delivery at supply onset, the injection duration can thus be lengthened as well. In combination with the above-described fuel injection pump, the pre-injection quantity pumped by the pump is optimally smoothed here and the injection rate reduced. Rpm-dependent predelivery effects, which would lead to an increase in the preinjection quantity with increasing rpm, can be balanced out, since the throttling in the injection valve in combination with the shorter time available with increasing rpm acts in compensatory fashion in this way, and the greater fuel injection quantity pumped is shifted to the main injection, which begins upon the further stroke of the valve needle contrary to the second compression spring, or is tripped by the second delivery stage of the pump piston after interruption of the delivery.

Instead of the injection valve described here, other forms of injection valves, such as blind-bore injection valves, can be used in certain cases if needed, in combination with a two-spring holder as described here having the compression springs 59 and 63. In applications for this type of injection systems but which do not inject directly into the main combustion chamber, a throttle tang injection valve can then be used for injection into antechambers or swirl chambers, instead of the above-described blind bore injection valve with two-stage opening. The above version, with injection openings beginning at the valve seat, has the special advantage that upon termination of the injection event, no further fuel can dribble into the combustion chamber, which reduces the hydrocarbon emissions of the engine.

When the fuel injection pump described at the outset above cooperates with the above-described valve, the particular advantageous effects referred to at the outset are attained.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A fuel injection pump for internal combustion engines, having at least one pump piston (1), which is driven by a cam drive means to reciprocate and rotate in a pump cylinder (3) of a cylinder liner (2) in order to carry out intake and pumping strokes, said piston includes one face end (9) that encloses a pump work chamber (5), fuel is aspirated from a suction chamber (15) via a fuel line (17) that discharges into the pump cylinder, during an intake stroke of the pump piston, and from said pump work chamber during a delivery stroke of the pump piston fuel is pumped via a pressure line to injection valves (12) for injection into said internal combustion engine said pump piston includes grooves (21,22), said grooves including a first control edge (23), by way of said first control edge (23) the pump work chamber (5) is made to communicate with at least one opening in the wall of the pump cylinder liner (2), furthermore, a recess (25) is provided on the jacket of the pump piston (1) with a limiting edge extending transversely to the axis of the pump piston and a recess (26) in the wall of the pump cylinder liner (2) having at least one limiting edge extending preferably likewise transversely to the axis of the pump cylinder, said recesses (25, 26) coincide with one another over a portion of the pump piston delivery stroke and during at least some of the coincidence, after a portion of the pump piston delivery stroke, simultaneously communicate with the pump work chamber (5) and a relief line (17) via a control groove arm (30) moved with the pump piston in order to control fuel flow to an injection valve (12).

2. A fuel injection pump as defined by claim 1, in which the discharge of the fuel injection line into the pump cylinder is effected via said at least one opening (18) which is an inlet opening, which toward the pump work chamber, said inlet opening (18) has a limiting edge (32) extending on the pump piston parallel to the end face (9), which is overtaken by the end face (9) at the onset of the high-pressure delivery by the pump piston.

3. A fuel injection pump as defined by claim 2, in which the inlet opening (18) of the fuel line simultaneously serves as a relief opening, which cooperates with said first control edge (23) extending obliquely to the axis of the pump piston.

4. A fuel injection pump as defined by claim 3, in which the fuel line (17) with its inlet opening (18) acts as a relief line, with which the recesses (25, 26) communicate, upon coincidence after a portion of the pump piston delivery stroke, controlled by the control edge (30) moved with the pump piston.

5. A fuel injection pump as defined by claim 1, in which as the recesses on the pump piston and recesses in the wall of the pump cylinder, annular grooves (25, 26) are provided wherein the annular groove (25) in the pump piston communicates continuously with the pump work chamber (5) via a conduit (33) extending in the pump piston, and comes to coincide with the annular groove (26) in the wall of the pump cylinder (3) in the course of the pump piston stroke and the annular groove (26) in the pump cylinder can be made to communicate with one of the inlet openings, via a connecting groove (28) extending in the pump piston, which groove has limiting edges extending toward the pump work chamber transversely to the axis of the pump piston.

6. A fuel injection pump as defined by claim 2, in which as the recesses on the pump piston and recesses in the wall of the pump cylinder, annular grooves (25, 26) are provided wherein the annular groove (25) in the pump piston communicates continuously with the pump work chamber (5) via a conduit (33) extending in the pump piston, and comes to coincide with the annular groove (26) in the wall of the pump cylinder (3) in the course of the pump piston stroke and the annular groove (26) in the pump cylinder can be made to communicate with one of the inlet openings, via a connecting groove (28) extending in the pump piston, which groove has limiting edges extending toward the pump work chamber transversely to the axis of the pump piston.

7. A fuel injection pump as defined by claim 3, in which as the recesses on the pump piston and recesses in the wall of the pump cylinder, annular grooves (25, 26) are provided wherein the annular groove (25) in the pump piston communicates continuously with the pump work chamber (5) via a conduit (33) extending in the pump piston, and comes to coincide with the annular groove (26) in the wall of the pump cylinder (3) in the course of the pump piston stroke and the annular groove (26) in the pump cylinder can be made to communicate with one of the inlet openings, via a connecting groove (28) extending in the pump piston, which groove has limiting edges extending toward the pump work chamber transversely to the axis of the pump piston.

8. A fuel injection pump as defined by claim 4, in which as the recesses on the pump piston and recesses in the wall of the pump cylinder, annular grooves (25, 26) are provided wherein the annular groove (25) in the pump piston communicates continuously with the pump work chamber (5) via a conduit (33) extending in the pump piston, and comes to coincide with the annular groove (26) in the wall of the pump cylinder (3) in the course of the pump piston stroke and the annular groove (26) in the pump cylinder can be made to communicate with one of the inlet openings, via a connecting groove (28) extending in the pump piston, which groove has limiting edges extending toward the pump work chamber transversely to the axis of the pump piston.

9. A fuel injection pump as defined by claim 5, in which the connecting groove (28), disposed in the wall of the pump cylinder (3) on the side toward the annular groove (26), also has limiting edges, which extend transversely to the axis of the pump piston.

10. A fuel injection pump as defined by claim 6, in which the connecting groove (28), disposed in the wall of the pump cylinder (3) on the side toward the annular groove (26), also has limiting edges, which extend transversely to the axis of the pump piston.

11. A fuel injection pump as defined by claim 7, in which the connecting groove (28), disposed in the wall of the pump cylinder (3) on the side toward the annular groove (26), also has limiting edges, which extend transversely to the axis of the pump piston.

12. A fuel injection pump as defined by claim 8, in which the connecting groove (28), disposed in the wall of the pump cylinder (3) on the side toward the annular groove (26), also has limiting edges, which extend transversely to the axis of the pump piston.

13. A fuel injection pump for internal combustion engines, having at least one pump piston (1), which is driven by a cam drive means to reciprocate and rotate in a pump cylinder (3) of a cylinder liner (2) in order to carry out intake and pumping strokes, said piston includes one face end (9) that encloses a pump work chamber (5), fuel is aspirated from a suction chamber 15 via a fuel line (17) that discharges into the pump cylinder, during an intake stroke of the pump piston, and from said pump work chamber during a delivery stroke of the pump piston fuel is pumped via a pressure line to injection valves (12) for injection into said internal combustion engine said pump piston includes grooves (21,22), said grooves including a first control edge (23), by way of said first control edge (23) the pump work chamber (5) is made to communicate with at least one opening in the wall of the pump cylinder liner (2), furthermore, a recess (25) is provided on the jacket of the pump piston (1) with a limiting edge extending transversely to the axis of the pump piston and a recess (26) in the wall of the pump cylinder liner (2) having at least one limiting edge extending preferably likewise transversely to the axis of the pump cylinder, said recesses (25, 26) coincide with one another over a portion of the pump piston delivery stroke and during at least some of the coincidence, after a portion of the pump piston delivery stroke, simultaneously communicate with the pump work chamber (5) and a relief line (17) via a control groove arm (30) moved with the pump piston in order to control fuel flow to an injection valve (12), said injection valve has a valve needle (37), which controls at least one outlet opening and is movable in the closing direction by the fuel pressure, counter to the force of a first valve spring (59), against a movable stop (64), which is loaded by a second valve spring (63) and can be raised as the fuel pressure increases further from a fixed stop (66), wherein in an opening position of the valve needle (37) on the movable stop (64) located in contact with the fixed stop, the cross section, determining the fuel outlet, of the at least one outlet opening of the injection valve is reduced compared with that when the injection valve is fully opened when the movable stop (64) is raised from the fixed stop, and the reduction being in the direction of throttling the fuel injection.

* * * * *